(12) United States Patent
Baulier et al.

(10) Patent No.: US 6,364,600 B1
(45) Date of Patent: Apr. 2, 2002

(54) PINION SUPPORT

(75) Inventors: Dominique R. M. Baulier; Leonard Solcz, both of Windsor (CA)

(73) Assignee: Valiant Corporation, Windsor (CA)

( * ) Notice: Subject to any disclaimer, the term of this patent is extended or adjusted under 35 U.S.C. 154(b) by 0 days.

(21) Appl. No.: 09/272,707

(22) Filed: Mar. 19, 1999

(51) Int. Cl.⁷ .................................................. B25J 3/00
(52) U.S. Cl. ..................................... 414/754; 74/813 C
(58) Field of Search .................................. 414/754, 779, 414/783; 74/813 R, 813 C, 815 L, 826, 816

(56) References Cited

U.S. PATENT DOCUMENTS

| | | | |
|---|---|---|---|
| 4,670,961 A | 6/1987 | Fontaine et al. | 29/429 |
| 4,946,089 A | 8/1990 | Baulier et al. | 228/45 |
| 5,178,040 A * | 1/1993 | Schmidt | 74/813 L |
| 5,960,676 A * | 10/1999 | Pferfev et al. | 74/813 C |
| 6,095,014 A * | 8/2000 | Chen et al. | 74/813 C |

* cited by examiner

Primary Examiner—Kenneth W. Noland
(74) Attorney, Agent, or Firm—Gifford, Krass, Groh, Sprinkle, Anderson & Citkowski, P.C.

(57) ABSTRACT

A pinion support is disclosed for use with a motor set on a gear box casing and an output drive pinion having an axial recess at the outer end of the pinion. The pinion support includes a housing which is rigidly secured against movement to the gear box casing and includes a portion which overlies the outer end of the pinion. A pin is rigidly secured to the portion of the housing and this pin extends coaxially into the axial recess at the outer end of the pinion. A bearing assembly is operatively positioned between an outer surface of the pin and an inner surface of the pinion recess. The pinion support is particularly well suited for use in an automotive framing system.

16 Claims, 3 Drawing Sheets

PINION SUPPORT

BACKGROUND OF THE INVENTION

I. Field of the Invention

The present invention relates to a pinion support for supporting a free end of a pinion when operating in restricted room condition.

II. Description of the Prior Art

Actuator motors with gear boxes are used in many industrial applications, such as an automotive framing system. In an automotive framing system, a motor set on a gear box is rigidly secured to a turret frame. The motor, upon actuation, rotatably drives a pinion which protrudes outwardly from one end of a gear box.

In many applications, such as an automotive framing system, the precise rotational position of the pinion is required for accurate and satisfactory operation of the entire system. In many such applications, however, the pinion is subjected to high torque which may result in slight flexing of the pinion away from the load. Any such flexing not only results in unsatisfactory oscillation of the system, but can also result in inaccurate positioning of the load driven by the motor/gear box, and in some case in shaft breaking by fatigue.

SUMMARY OF THE PRESENT INVENTION

The present invention provides a pinion support which overcomes the above-mentioned disadvantages of the previously known devices.

In brief, the pinion support of the present invention comprises a generally cylindrical housing which is rigidly secured to the motor casing in any conventional fashion, such as by bolts. Furthermore, in the preferred embodiment of the invention, the housing includes a cylindrical flange which is sandwiched in between a mating cylindrical flange on the motor casing and a portion of the frame associated with the motor/gear box.

The housing further includes a cylindrical portion which extends coaxially around the pinion and has an end plate which overlies the outer or free end of the pinion. This cylindrical portion, furthermore, includes an opening along one side to expose the pinion and provide access between the pinion and its load, i.e. a gear wheel.

A cylindrical pin is rigidly fixed to the end plate and extends coaxially into an axial recess formed on the outer end of the pinion. A bearing assembly is operatively disclosed between the pin and the pinion recess and, preferably, a seal is provided between the pin and pinion recess to protect the bearing assembly from debris.

In operation, the rotational support provided between the pin and the bearing assembly and the outer or free end of the pinion operates to support the pinion and preclude flexing of the pinion relative to the housing and thus relative to the gear box casing. In practice, such support not only eliminates flexing of the pinion during operation and radial load on output bearing, but also prevents oscillation and vibration of the motor which can otherwise occur especially in case of speed or torque closed loop control, with heavy inertia.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
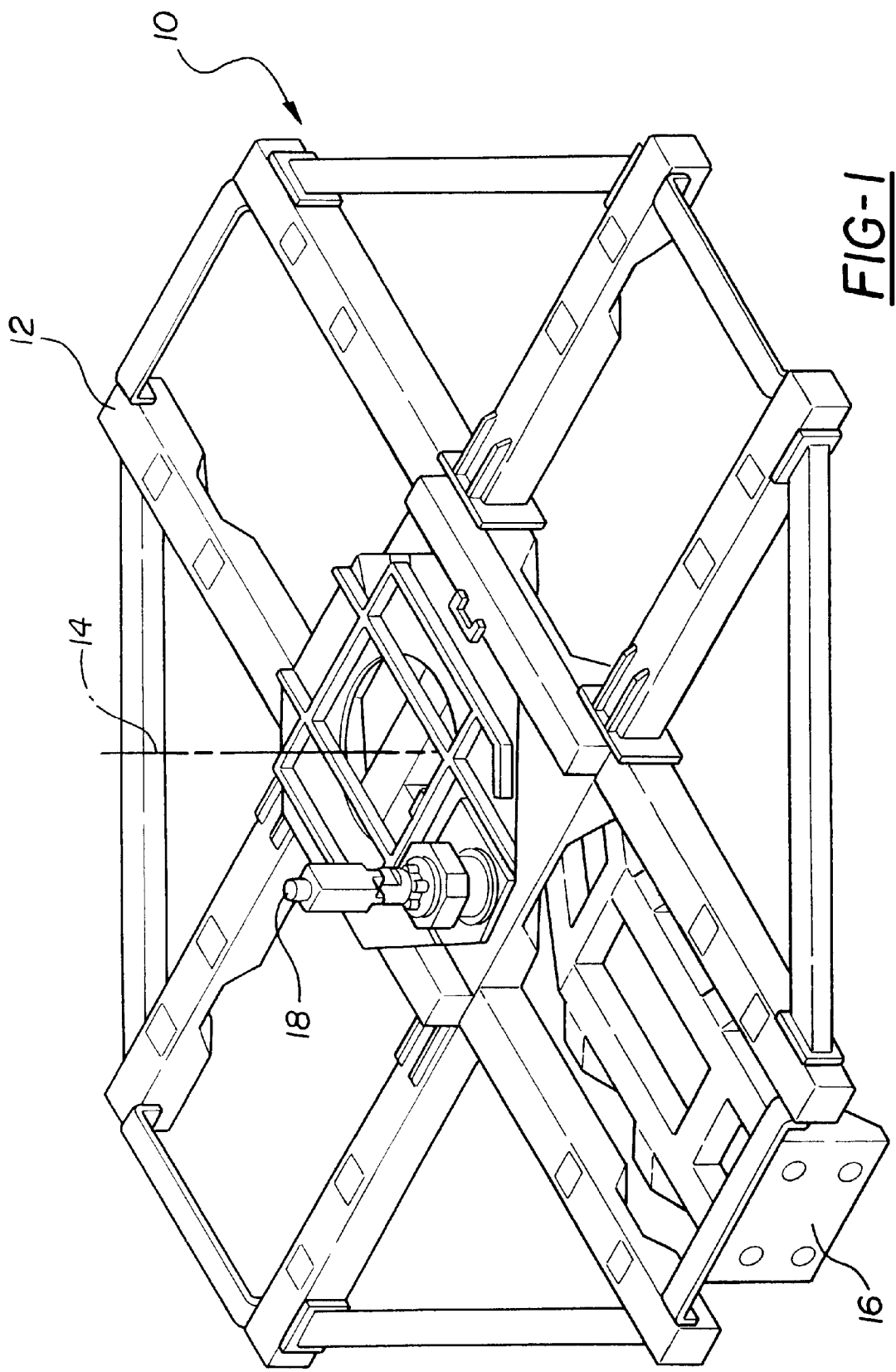
FIG. 1 is an isometric view illustrating a preferred embodiment of the present invention utilized in connection with a tooling magazine of an automotive framing system.

With reference to FIG. 1, a portion of an automotive framing system 10 is there shown having a turret 12 which is rotatable about a generally vertical axis 14. In the well known fashion, tooling 16 is supported by the turret 12 to selectively clamp an automotive body (not shown) prior to welding.

The automotive framing system 10 typically accommodates several different models of vehicles, each vehicle having its own set of tooling 16. In order to position the tooling 16 at the work station, a motor 18 is selectively actuated to rotatably index the turret 12 about the vertical axis 14.

Figure 2:
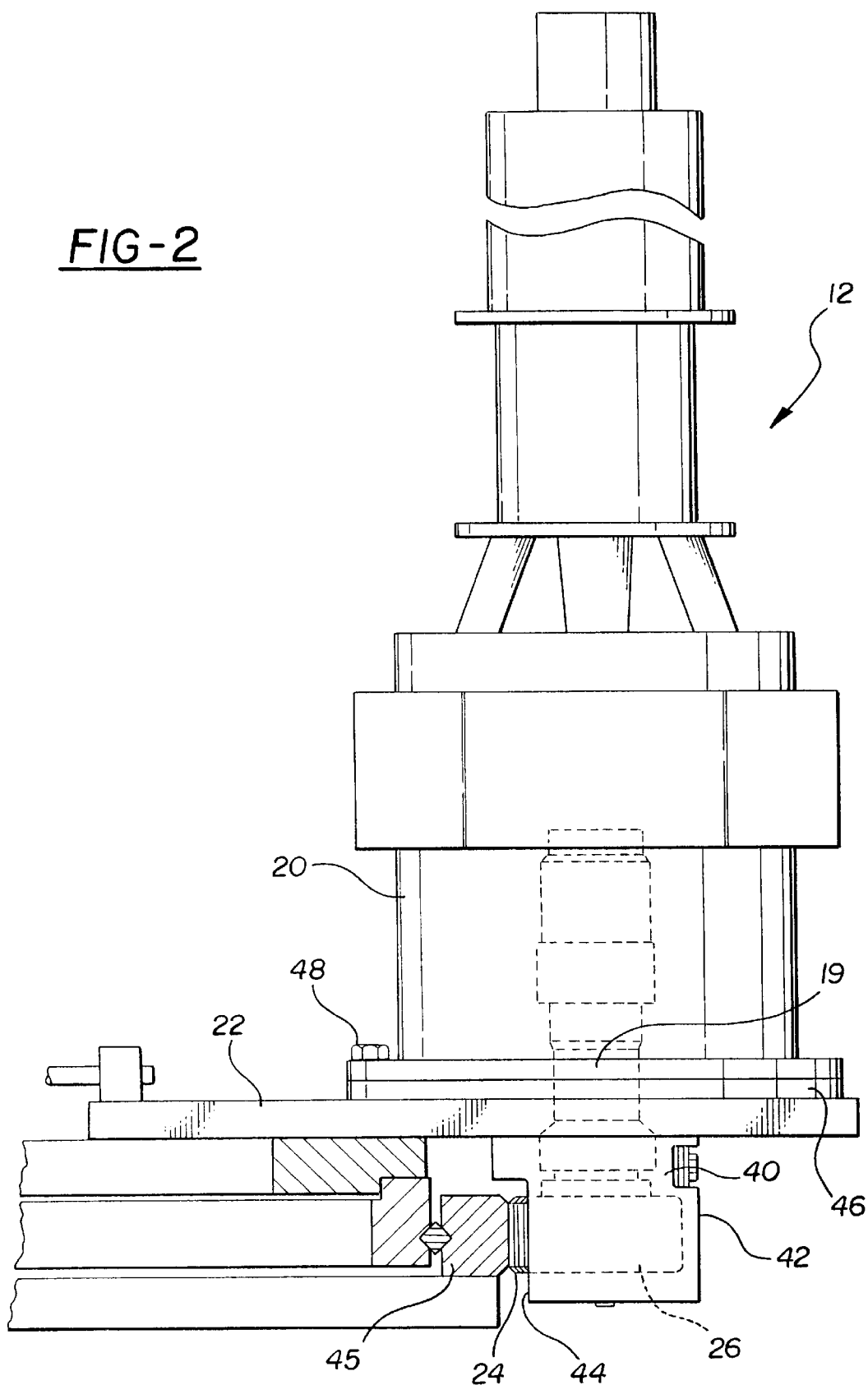
FIG. 2 is a side view illustrating the preferred embodiment of the present invention.
Figure 3:
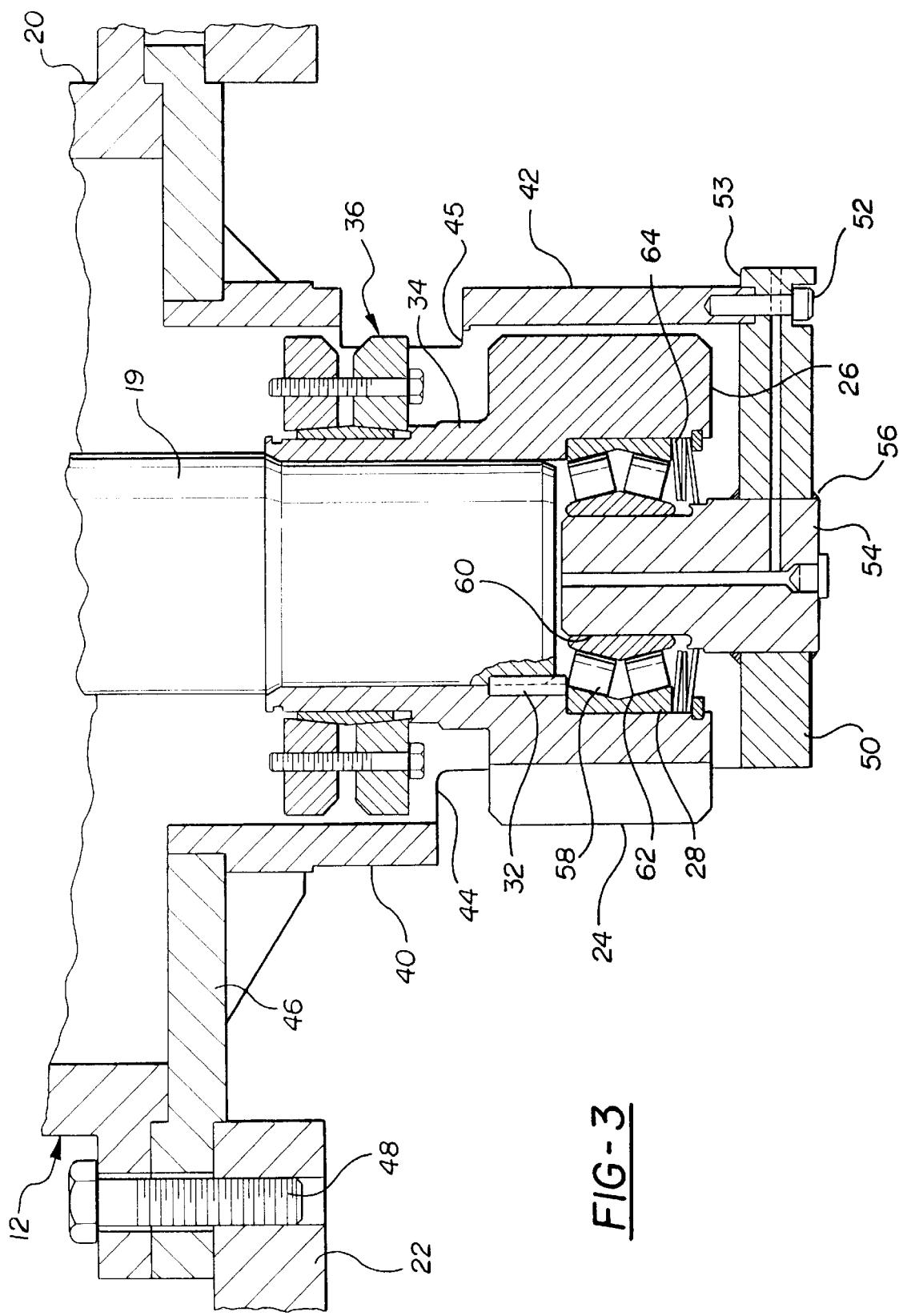
FIG. 3 is a sectional view illustrating the preferred embodiment of the present invention.

With reference now to FIGS. 2 and 3, the motor 18 drives a gear box 20 which is rigidly secured to a frame 22 of the framing system 10. An output or drive pinion 24 is selectably rotatably driven by a drive shaft 19 from the gear box 20 in order to index the turret 12 through the gear wheel 45. This pinion 24 includes an outer end 26 as well as an axial cylindrical recess 28 (FIG. 3) at its outer end 26.

Referring particularly to FIG. 3, any conventional means 24 can be employed to secure the pinion 24 to the gear box shaft 19. However, as illustrated in the drawing, preferably a key 32 is positioned between registering slots in the shaft 30 and a pinion sleeve 34. This key 32 prevents rotation of the pinion 24 relative to the gear box 19. A conventional clamp assembly 36 is then disposed around the pinion sleeve 34 which, upon tightening, radially inwardly compresses the sleeve 34 against the shaft 19 thereby locking the pinion 24 to the shaft 19.

With reference now to FIGS. 2 and 3, the present invention provides a generally cylindrical housing 40 having a cylindrical portion 42 which extends coaxially around the pinion 24. This cylindrical portion 42 includes an opening 44 along one side to expose the pinion 24 and enable the pinion 24 to mesh with its load, i.e. a gear wheel 45 (FIG. 3). The cylindrical portion 42 includes a further opening 45 to provide access to the clamp assembly 36 for tightening as required. This opening 45 can also be used to lubricate the gearing by a lubrication nozzle.

The housing 40 further includes an annular mounting flange 46 which is rigidly secured against movement to the gear box casing 20. Preferably, the mounting flange 46 is sandwiched in between the motor casing 20 and the system frame 22 and then secured together by bolts 48.

As best shown in FIG. 3, the housing 40 further includes an end plate 50 which overlies the outer end 26 of the pinion 24. This end plate 50 is generally circular in shape and is secured to the housing cylindrical portion 42 in any conventional fashion, such as by bolts 52 and centering groove 53.

A cylindrical pin 54 is rigidly secured to the end plate 50 in any conventional fashion, such as by welds 56, such that the pin 54 extends coaxially into the axial recess 28 on the outer end 26 of the pinion 24. A bearing assembly 58 is then operatively disposed between an outer cylindrical surface 60 on the pin 54 and an inner cylindrical surface 62 on the pinion recess 28. Any conventional bearing assembly 58, such as a roller bearing assembly, can be used.

A seal 64 is disposed across the outer end of the bearing assembly 58 between the pin 54 and the pinion recess 28. This seal 64 protects the bearing assembly 58 from debris. A lubrication channel is set through the pin 60 and cover plate so as to lubricate the bearing.

In operation, the housing 40, through the pin 54 and bearing assembly 58, supports the outer end 26 of the pinion 24 against flexing during a high torque condition. In practice, when used with an automotive framing system, the pinion support of the present invention effectively prevents vibration and oscillation of the pinion 24 and motor 18 during operation and ensures quick and accurate positioning of the tools 16 during operation.

A primary advantage of the pinion support of the present invention is that the pinion support can be used to retrofit existing framing systems without modification of the framing system itself. Such retrofitting can be accomplished merely by securing the housing 40 in between the motor casing 18 and the system frame 22 and installing a new pinion 24 on the motor shaft 30.

Having described our invention, however, many modifications thereto will become apparent to those skilled in the art to which it pertains without deviation from the spirit of the invention as defined by the scope of the appended claims.

We claim:

1. For use with a motor and gear box with an output drive pinion having an axial recess at an outer end, a pinion support comprising:

a housing, said housing being rigidly secured against movement to the gear box casing and having a portion which overlies the outer end of the pinion, a pin rigidly secured to said portion of said housing, said pin extending coaxially into the axial recess of the pinion, and a bearing assembly operatively positioned between an outer surface of said pin and an inner surface of the pinion recess;

wherein said housing portion is substantially cylindrical in shape, said housing portion having a cut out on one side, said cut out being open to an outer periphery of the pinion.

2. The invention as defined in claim 1 wherein the axial recess of the pinion is cylindrical in cross sectional shape.

3. The invention as defined in claim 1 wherein said pin is supported by an end plate centered and secured by a groove and bolted to said housing.

4. The invention as defined in claim 1 wherein said bearing assembly is a roller bearing assembly.

5. The invention as defined in claim 1 wherein the gear box casing is rigidly mounted to a frame and wherein said housing includes a mounting flange sandwiched between the frame and the gear box casing.

6. For use with a motor and gear box with an output drive pinion having an axial recess at an outer end, a pinion support comprising:

a housing, said housing being rigidly secured against movement to the gear box casing and having a portion which overlies the outer end of the pinion, a pin rigidly secured to said portion of said housing, said pin extending coaxially into the axial recess of the pinion, and a bearing assembly operatively positioned between an outer surface of said pin and an inner surface of the pinion recess;

wherein the gear box casing is rigidly mounted to a frame and wherein said housing includes a mounting flange sandwiched between the frame and the gear box casing.

7. The invention as defined in claim 6 wherein said mounting flange is cylindrical in shape and equipped with centering shoulder and boring.

8. The invention as defined in claim 6 wherein the frame supports a tool rotative magazine for an automotive framing system.

9. For use with a motor and gear box with an output drive pinion having an axial recess at an outer end, a pinion support comprising:

a housing, said housing being rigidly secured against movement to the gear box casing and having a portion which overlies the outer end of the pinion, a pin rigidly secured to said portion of said housing, said pin extending coaxially into the axial recess of the pinion, and a bearing assembly operatively positioned between an outer surface of said pin and an inner surface of the pinion recess;

wherein said housing portion comprises a cylindrical section extending coaxially around the pinion, said cylindrical section having an opening on one side, and an end plate overlying the outer axial end of the pinion, said pin being secured to said end plate.

10. The invention as defined in claim 9 wherein said end plate is removably secured to said cylindrical section by bolts and groove.

11. The invention as defined in claim 9 and comprising a seal disposed between said pin and the pinion recess.

12. The invention as defined in claim 11, and comprising a lubrication channel through the pin and the end plate to lubricate the bearing.

13. The invention as defined in claim 9, and comprising a second opening on the other side, to perform initial tightening or further checking of pinion clamp assembly.

14. The invention as defined in claim 13, where this second opening is used to adapt a lubrication nozzle for the gear system (pinion and wheel gear).

15. For use with a motor and gear box with an output drive pinion having an axial recess at an outer end, a pinion support comprising:

a housing, said housing being rigidly secured against movement to the gear box casing and having a portion which overlies the outer end of the pinion, a pin rigidly secured to said portion of said housing, said pin extending coaxially into the axial recess of the pinion, and a bearing assembly operatively positioned between an outer surface of said pin and an inner surface of the pinion recess;

wherein said pin is supported by an end plate centered and secured by a groove and bolted to said housing.

16. The invention as defined in claim 15 wherein said housing portion is substantially cylindrical in shape, said housing portion having a cut out on one side, said cut out being open to an outer periphery of the pinion.

* * * * *